United States Patent [19]

Stults et al.

[11] Patent Number: 4,987,492
[45] Date of Patent: Jan. 22, 1991

[54] USER INTERFACE CONTROL FOR COMMUNICATION SYSTEM

[76] Inventors: Robert A. Stults, 2290 Yale St., Palo Alto, Calif. 94306; Steven R. Harrison, 134 Russell Ave., Portola Valley, Calif. 94025-7214; Thomas E. Merrow, 3118 SW. Casade Dr., Portland, Oreg. 97201; Jane J. Laursen, 16972 SW. Greentree Ave., Lake Oswego, Oreg. 97034; George O. Goodman, 16770 NW. Coburg La., Beaverton, Oreg. 97006; Jay Trow, 1924 San Ramon, Mountain View, Calif. 94043; Mark J. Abel, 3800 E. Orchard R., Littleton, Colo. 80121

[21] Appl. No.: 101,711

[22] Filed: Sep. 28, 1987

[51] Int. Cl.⁵ ............... H04N 5/262; H04N 1/42
[52] U.S. Cl. ........................... 358/181; 379/53; 358/85
[58] Field of Search ............... 358/181, 86, 85; 379/53, 54

[56] References Cited

U.S. PATENT DOCUMENTS

| | | | |
|---|---|---|---|
| 3,668,307 | 6/1972 | Face et al. | 178/5.6 |
| 4,054,908 | 10/1977 | Poirier et al. | 358/85 |
| 4,264,928 | 4/1981 | Schober | 358/125 |
| 4,400,724 | 8/1983 | Fields | 358/85 |
| 4,516,156 | 5/1985 | Fabris et al. | 358/85 |
| 4,521,870 | 6/1985 | Babbel et al. | 364/900 |
| 4,525,779 | 6/1985 | Davids et al. | 364/200 |
| 4,540,850 | 9/1985 | Herr et al. | 179/2 DP |
| 4,645,872 | 2/1987 | Pressman et al. | 379/54 |
| 4,650,929 | 3/1987 | Boerger et al. | 358/86 |
| 4,653,045 | 3/1987 | Stanley et al. | 370/62 |
| 4,686,698 | 8/1987 | Tompkins | 358/181 |
| 4,785,472 | 11/1988 | Shapiro | 379/96 |

FOREIGN PATENT DOCUMENTS 0228053 7/1987 European Pat. Off. .

OTHER PUBLICATIONS

Allen, Keith J., and Helstern, Thomas K., "Customer-Controlled Video Switching for Teleconference," IEEE Global Telecommunications Conference, vol. 2, Houston, Texas, Dec. 1986, pp. 907-914.

Aguilar, L., Garcia-Luna-Aceves, J. J. Moran, D., Craighill, E. J., and Brungardt, R., "Architecture for a Multimedia Teleconferencing System," Journal of the ACM, 1986, pp. 126-136.

Primary Examiner—Tommy P. Chin

[57] ABSTRACT

Switch connections in a communication network are represented and displayed to a user, enabling the user to provide switch request signals based on the state of the connections. The representation is presented on the display of a workstation, and the user provides a sequence of switch request signals with the workstation's keyboard and mouse. A control procedure executed by the workstation generates a sequence of switch control signals based on the switch request signals. The switch control signals are provided to a switching server that converts them into commands to a switch that, in turn, switches connections between communication devices, such as cameras, monitors and microphones. These devices are positioned in groups, each group with one of the workstations. The representation may include a separate display feature representing each group, each group's display feature being at a separate location. Connections may be represented by lines between the groups that are connected. The control procedure also provides data so that the representation shows the current connections, including update data when connections are switched. This update data is based on a connection data structure in a shared file accessible by all the workstations on a network. A locking file in the same shared file system prevents interference between switch request signals from different users. A user can modify the switch control signal sequence based on a switch request signal sequence by accessing a signal data structure used by the control procedure to generate the switch control signals.

18 Claims, 10 Drawing Sheets

150 →

SIGNAL DATA STRUCTURE ENTRY

| RECOGNIZER | BRANCH TYPE | RESPONSE GENERATOR |
|---|---|---|
| 152 | 154 | 156 |

CONNECTION DATA STRUCTURE ENTRY

| SOURCE DEVICE | DESTINATION DEVICE | AUDIO / VIDEO | ACCESS CONTROL |
|---|---|---|---|
| 162 | 164 | 166 | 168 |

*FIG. 7*

USER INTERFACE CONTROL FOR COMMUNICATION SYSTEM

BACKGROUND OF THE INVENTION

The present invention relates to techniques by which a user is able to control a video and audio communication system. More specifically, the invention relates to techniques that provide each user with a display enabling that user to control a switch that makes and breaks connections between communication devices.

Pressman et al., U.S. Pat. No. 4,645,872, describe a videophone network system which includes a control console at each of a plurality of stations. Each station also includes video and audio inputs and outputs, with central switching devices connecting the inputs and outputs. As shown in FIG. 3, each control console includes pushbuttons for selecting functions and stations. Two LEDs assocaited with each station's pushbutton indicate the status of that station. The LEDs indicate whether the station is unconnected, connected or busy, for example. A user can use the pushbuttons to control the switching devices, and the LEDs provide helpful information to the user.

Boerger et al., U.S. Pat. No. 4,650,929, describe a similar videoconferencing system. FIG. 12 shows a controller unit at a participant location, including a display. The participants receive checkback information on the status of the controls and other components of the network through this display, which may include signal lamps, alphanumeric display and so forth.

Fields, U.S. Pat. No. 4,400,724, describes a teleconference system for multiple stations in which one object is to provide a virtual conference space or a naturalistic rendition of a physical space to simulate a face-to-face conference. In other words, cameras and displays are positioned so that the conferees have the same relative locations at each station even though they are at separate locations. Each conferee has a control box with control switches governing interconnections between stations through relays at a central control room.

Face et al., U.S. Pat. No. 3,668,307, describe a two-way closed circuit television system in which a terminal has a control unit for communication with the control center and thence to other terminals under control of the control center, so that the control center delegates part of its supervisory authority to a selected terminal for a period of time. Poirier et al., U.S. Pat. No. 4,054,908, describe a videotelephone conference system in which switching is controlled by signals based on the loudness of speech signal for a microphone or cumulatively for a room. Schober, U.S. Pat. No. 4,264,928, similarly describes a conference video system which uses microphones coupled through circuit elements to a servomotor which positions a mirror to focus on a speaker and aims the camera field of vision toward active audio.

D. C. Swinehart, L. C. Stewart and S. M. Ornstein, "Adding Voice to an Office Computer Network", *Proceedings of IEEE GlobeCom '83 Conference*, Nov. 1983, reprinted as Xerox PARC CSL-83-8, describe a telephone system in which workstations connected by an Ethernet network manage voice switching. A user may use a workstation to provide commands to a telephone control server which in turn controls switching between standardized telephone peripherals connected to the network.

It would be advantageous to have improved techniques for user control of a video and audio system.

SUMMARY OF THE INVENTION

The present invention provides techniques which enable a user to control the switching of a communication network based on information about connections between stations. Furthermore, the invention provides techniques for controlling the presentation of the connection information to the user, permitting a wide variety of user interfaces for controlling such a network.

One aspect of the invention is based on the recognition that a user of a conventional communication network lacks adequate information about the existing connections. This aspect is based on the further recognition that this problem can be solved with a system which includes a display, such as a cathode ray tube (CRT), and a user input device, such as a keyboard and mouse. A control means provides data so that the display presents a representation of the connections. The control means also provides a sequence of switch control signals based on a sequence of signals from the user input device requesting a switching operation, and a switching means performs switching in response to these switch control signals. As a result, a user has adequate information to request switching of connections. When the switching means performs switching in response to the switch control signals, the displayed representation can be updated to represent the switched connections.

Another aspect of the invention is based on the recognition that information about connections between a number of devices is typically difficult for a human to comprehend. This aspect is based on the discovery that a human can readily comprehend connection information if the devices being connected are represented by display features at separate locations on the display and the connections between them are represented by display features extending between the device representations. If the devices are grouped at a number of stations, for example, each station could be represented by a corresponding display feature, each station's display feature being at a location on the display different from the locations of the display features of other stations. If devices at two stations are connected, the connection could be represented by a line or other link between those stations' display features. As a result of viewing such a representation of the connections, the user has a sense that the stations are positioned at relative locations within a single space.

A closely related aspect is based on the recognition that the development and improvement of techniques for graphically representing connections is an iterative process, and further that no single technique is likely to provide a representation which is suitable for every use. This aspect of the invention solves these problems by enabling the user to modify the sequence of switch control signals provided in response to a switch request signal sequence. Each switch control signal is one of a set of standard commands to the switching means which can be generated from a wide variety of user input signals, and the user can modify the manner in which the control means provides these standard commands based on the user input signals. Also, the invention can be implemented on a system that permits the user to modify the manner in which the devices and connections between devices are represented on the display. As a result, a system according to the invention can be used to modify and develop an unlimited variety of user interface techniques for communication networks.

Another closely related aspect is based on the recognition that a user typically thinks of achieving a desired state of connections in terms that are different from switching operations. Typically, there is not a one-to-one relationship between the user input signals and the appropriate switch control signals to perform the requested switch operation. The user is likely to describe a desired state in abstract terms unrelated to switching, such as by naming a group of people in various locations who should be able to see and hear each other and who sould be protected from interruptions from elsewhere by an appropriate level of privacy. The switch control signals, on the other hand, must define switching operations that cause those changes in the state of the connections that are necessary to provide a desired result. A user is typically occupied with matters other than switching, and would be distracted by translating a desire for a new state of connections into switch control signals. A system that requires the user to do this translation is therefore inefficient. This problem can be solved by a system that receives a sequence of signals in terms that are convenient to the user and that translates those signals into an equivalent switch control signal sequence, freeing the user from thinking about the details of switching. A signal data structure is provided that, for each user input signal requesting a switching operation, provides data to generate the correct sequence of switch control signals. Furthermore, the contents of the signal data structure can be changed to modify the switch control signal sequence provided based on a given sequence of signals from a user.

The representations of connections presented to all users should be consistent at any given time. This problem can similarly be solved by a data structure, in this case a connection data structure containing data indicating the connections. In addition, the switching means can include one or more switching servers on the data network with the workstations, each switching server controlling at least one switch; the connection data structure can be updated based on data from the switching servers. The control means in turn provides data so that all the displayed representations are consistent with the connection data structure.

In a network with several stations, two users could simultaneously request inconsistent switching operations. This problem can be solved with control means that operate to serialize user input signals. If the control means is implemented in a centralized manner, it can serialize user input signals based on the sequence in which it receives them. But if the control means is distributed, it can serialize the user input signals through a shared file that has a lock that can only be held by one workstation at a time. As a result, signals from the users are handled serially, in the sequence in which the lock is held.

The invention thus provides communication system control through a user interface which displays the state of connections of the system, facilitating switching in accordance with the user's desires. More than one user may control the system, with a single data structure containing data indicating the state of switch connections. The handling of switch requests avoids interference between users. A user can also modify the manner in which switch control signals are provided based on user input signals.

These and other objects, features and advantages of the invention will be more fully understood from the following description, together with the attached claims and drawings.

BRIEF DESCRIPTION OF THE DRAWINGS

FIG. 6 is a schematic representation of an entry in the signal data structure of FIG. 3.

FIG. 7 is a schematic representation of an entry in the connection data structure of FIG. 3.

DETAILED DESCRIPTION

A. General Description

Figure 1:
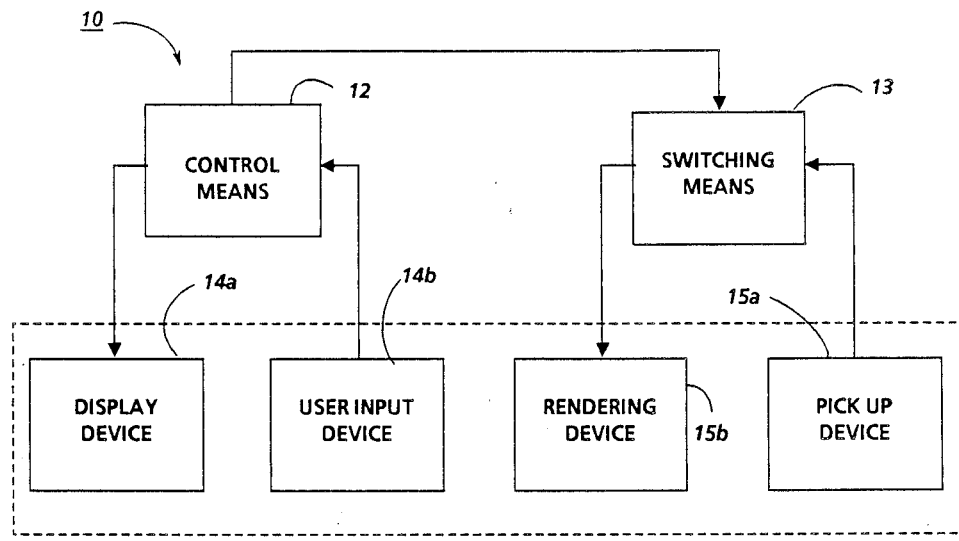
FIG. 1 is a schematic block diagram showing general functional components of a communication system according to the invention.
Figure 2:
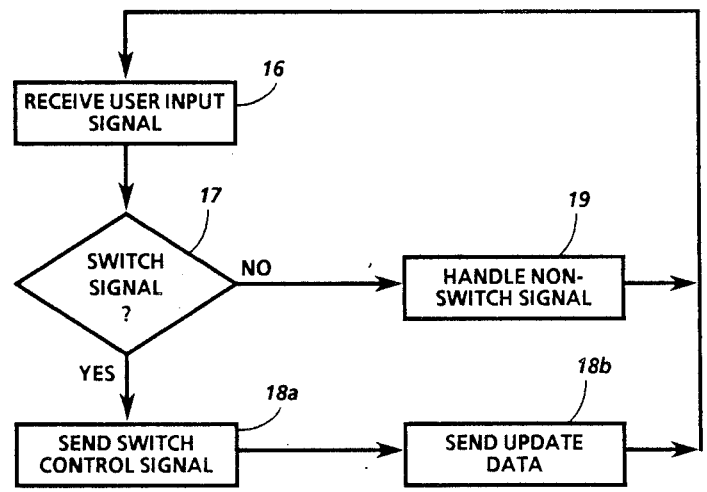
FIG. 2 is a flow chart showing general steps in the operation of the system of FIG. 1 according to the invention.
Figure 3:
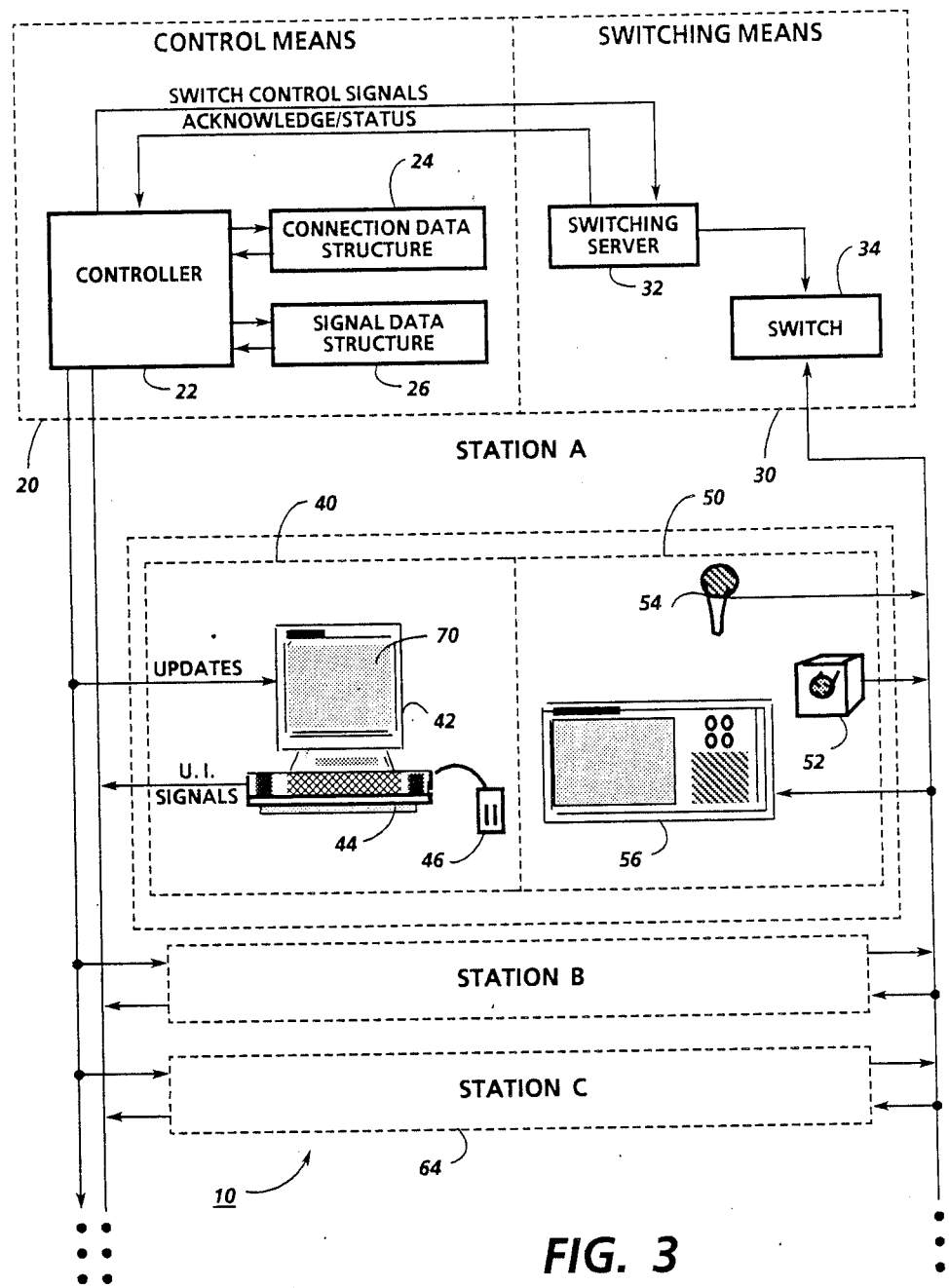
FIG. 3 is a block diagram showing in more detail components of a communication system according to the invention.
Figure 4A:
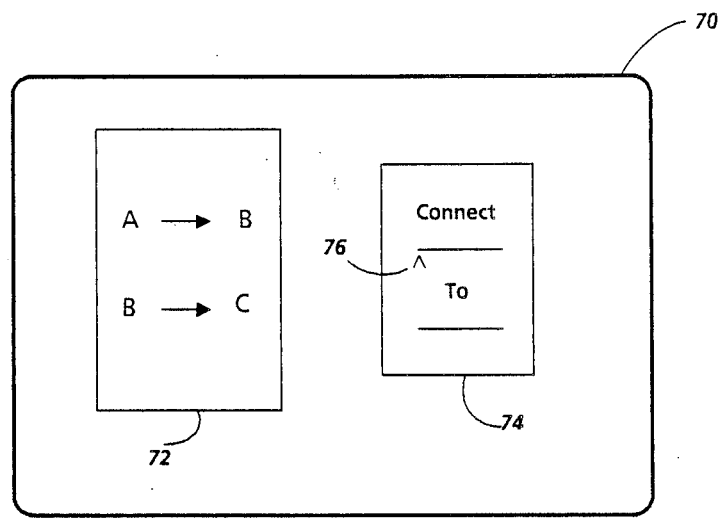
FIG. 4A is a schematic view of a representation of connections between communication devices appropriate to the system of FIG. 3.
Figure 4B:
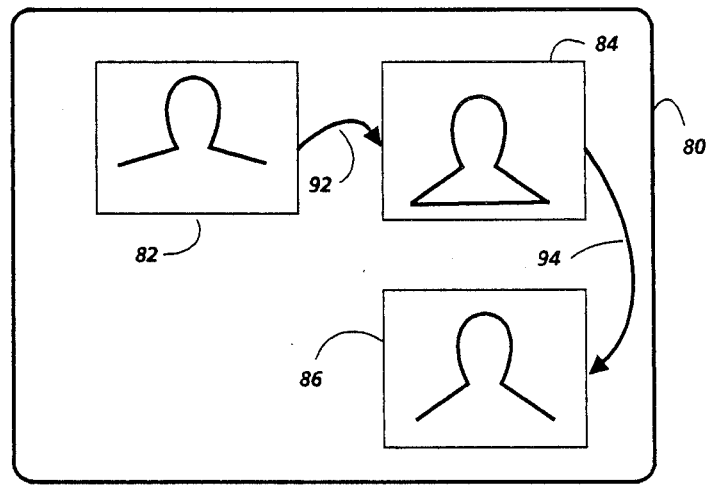
FIG. 4B is a schematic view of another representation of connections between communication devices appropriate to the system of FIG. 3.

FIGS. 1, 2, 3, 4A and 4B show general features of the invention, together with some more detailed features of an implementation of the invention. FIG. 1 shows the broad functional components of a communication system 10 according to the invention. FIG. 2 shows a general sequence of steps followed by the control means of system 10. FIG. 3 shows in more detail the components of one implementation of communication system 10. FIGS. 4A and 4B show examples of representations of a state of connection of system 10 appropriate for the implementation of FIG. 3.

Communication system 10 in FIG. 1 includes control means 12 and switching means 13. Signal paths link control means 12 to display 14a and to user input device 14b, through which a user can provide input data to system 10. Signal paths also link switching means 13 and a number of communication devices, such as pick up device 15a for picking up a signal and rendering device 15b for rendering a signal into perceptible form. As discussed below, pick up device 15a could be a microphone or camera, while rendering device 15b could be a speaker or display monitor. Signal paths could link switching means 13 to other types of communication devices, including recording and playback devices and other signal processing devices. Switching means 13 performs its switching function by selectively providing signal path connections between communication devices in response to switch control signals from control means 12. Switching means 13 can be any combination of hardware and software components capable of responding to switch control signals to obtain the appropriate resulting connections.

Control means 12 performs a control function which gives the user control of the connections provided by switching means 13. FIG. 2 shows the way it does so in the form of a general sequence of steps. In box 16, control means 12 receives a signal from user input device 14b. If the test in box 17 determines that those signals request a change in the connections between communication devices, control means 12 provides appropriate switch control signals to switching means 13 based on the user input signals, in box 18a. Control means 12 also provides update in box 18b so that display 14a presents a current representation of the state of connections between communication devices. As a result, the user can control the system more effectively based on information about the state of connections. If control means 12 provides the update data after switching means 13 changes connections in response to the switch control signals, the representation of the state of connections is more likely to be accurate at all times, resulting in better control. Finally, if the test in box 17 determines that the user input signal is not a signal requesting a switch operation, control means 12 handles the user input signal by performing the appropriate non-switch operation.

FIG. 3 shows a multi-station implementation of communication system 10 with a number of additional details. As shown, system 10 includes control means 20 and switching means 30, corresponding respectively to control means 12 and switching means 13 in FIG. 1. A user exchanges signals with control means 20 through user interface 40, and with switching means 30 through communication devices 50. User interface 40 and devices 50 are located together at station 60, designated "Station A", and, as shown, system 10 may include other stations 62, 64, and so forth, respectively designated "Station B", "Station C", etc. Each station may include at least one user interface and a number of communication devices. Optionally, some stations may have only a user interface with no devices and other stations may have only communication devices with no user interface.

Control means 20 performs its control function generally in the way set forth in FIG. 2, through the operations of controller 22. Controller 22 exchanges signals with each user interface in system 10, including user interface 40 at station 60. In the illustrated implementation, control means 20 also includes connection data structure 24, containing data indicating the state of connection of system 10, and signal data structure 26, containing data indicating the appropriate response to each signal from one of the user interfaces. If a user input signal is received requesting a switching operation or requesting another operation requiring a response from switching means 30, controller 22 accesses signal data structure 26 to obtain a sequence of switch control signals that it then sends to switching means 30. In the illustrated implementation, switching server 32 receives the switch control signals and responds appropriately. If a switch control signal requests a switching operation, switching server 32 causes switch 34 to modify the existing connections accordingly. Switching server 32 also provides acknowledge and status signals to controller 22 in response to appropriate switch control signals. Controller 22 updates connection data structure 24 based on status signals from switching server 32, and provides update data to the user interfaces so that the representations they present to users are kept current.

User interface 40 includes display 42, illustratively a CRT, and a user input device, illustratively keyboard 44 with mouse 46. User interface 40 may thus be the user interface of a conventional workstation. Communication devices 50 include camera 52 for picking up a visual image and providing a video signal, microphone 54 for picking up sounds and providing an audio signal, and monitor 56 for rendering both video and audio signals into perceptible sounds and images. These devices need not have a direct connection to user interface 40, but are positioned so that a user can provide video and audio signals through camera 52 and microphone 54 while viewing monitor 56 and while facing user interface 40.

During operation of system 10, switching means 30 performs its switching function by selectively providing connections between the communication devices of system 10 in response to switch control signals from control means 20. Control means 20 provides data to display 42 so that it presents a representation 70 of these connections to the user. The data includes updates so that representation 70 reflects the current state of connections in system 10, in accordance with the data in connection data structure 24. As a result, the user can see the current state of connections.

FIG. 4A shows representation 70, a text-based representation of connections. Each of the stations in FIG. 3 is represented in FIG. 4A by the corresponding character, and each connection between the communication devices of two stations is represented by a line of text in window 72. Each line of text includes a source character representing the station whose pick up devices are connected, a destination character representing the station whose rendering devices are connected, and an arrow from the source character to the destination character representing the connection itself. Window 74 is a prompter window within which the user can request a new connection by indicating a source and a destination. Cursor 76 in window 74 is the current input point. Rather than a single window, two prompter windows could be provided, one for the source character and one for the destination character. In either case, the user can use keyboard 44 and mouse 46 to request a desired connection between two stations.

FIG. 4B shows representation 80, a graphical representation of connections. Each of the stations in FIG. 3 is represented in FIG. 4B by a corresponding device display object, each device display object being at a separate location from the others. Thus each device display object can represent all the devices at a single location, which reduces the number of display objects and is intuitively logical, since there is ordinarily no need to show connections among pick up and rendering devices at the same location. Each device display object could instead represent a single device or an arbitrary group of devices. Rather than showing each group of devices as an object, a display feature could be provided to show each station as a room or other region within a group of similar regions, with the device display objects of a given station being shown together in the respective region.

Each device display object 82, 84 and 86 includes a visual cue identifying the station it represents, specifically a shape identifying the user at the station it represents. Display objects 82, 84 and 86 correspond respectively to stations A, B and C in FIG. 3. Any other appropriate visual cues could be used, including an image of a face for each station, a name, a character, a number, or any other identifier of each station.

In addition to device display objects, display 80 includes connecting links 92 and 94, each extending between two of the device display objects and each indicating the direction of connection, such as an arrow as shown in FIG. 4B. Connecting link 92 extends between objects 72 and 74, and its arrow indicates that at least one pick up device at Station A is connected to at least one rendering device at Station B, so that Station A can be viewed at Station B. Similarly, connecting link 94 extends between objects 74 and 76, so that Station B can be viewed at Station C. The lack of other connecting links indicates that, for example, Station C cannot be seen or heard at the other stations, while a user at Station A cannot see or hear any of the other stations.

A user viewing representation 80 is also able to use keyboard 44 and mouse 46 to indicate a change in the connections. For example, a user at Station A could request a connection between a pick up device at Station C and a rendering device at Station A, permitting the user to see Station C. This request could be made, for example, by appropriate clicks of buttons on mouse 46 to select objects 86 and 82 and by depressing a key on keyboard 44 to indicate the desired operation of establishing a connection. Or this request could be made by a mouse button click to obtain a pop-up menu on which the operation could then be selected, after which the user would indicate with further clicks the stations to be connected. Software within user interface 40 could convert the sequence of keyboard and mouse operations into a service request in a format or language suitable for control means 20 or signals resulting from those operations could be provided directly to control means 20.

We turn now to examine in more detail how control means 20 provides data for the representation of connections and provides switch control signals.

B. Control Means

Controller 22 is the heart of control means 20, but control means 20 may contain other components to assist operation of controller 22, such as connection data structure 24 and signal data structure 26. In effect, controller 22 is an intermediary between the user and switching means 30, passing messages back and forth so that switching means 30 connects communication devices in the manner desired by the user. In addition, controller 22 may perform other operations, such as modifying the switch control signals provided in response to a given user input signal.

Data structures 24 and 26 can each contain a collection of data entries, each entry with a structure as discussed below. Each data structure can also include data that applies to that structure as a whole. For example, each data structure may contain data characterizing transactions that controller 22 is currently performing on the data structure and other current accesses of the data structure by controller 22. In addition, connection data structure 24 can include data characterizing the status of switching server 32 and switch 34.

Figure 5:
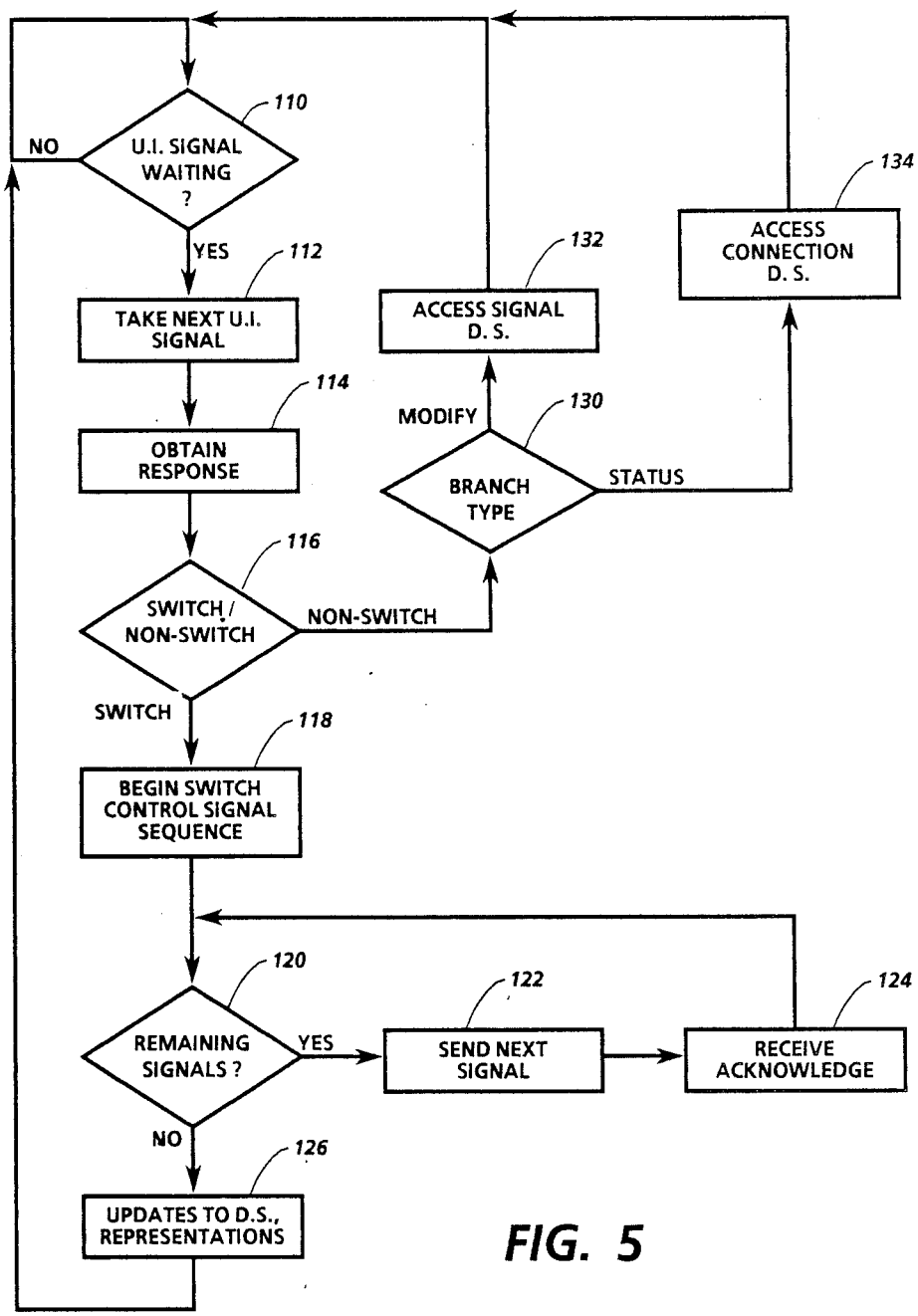
FIG. 5 is a flow chart showing operations of the control means of FIG. 3.

FIG. 5 shows how controller 22 may operate, including responding to a user input signal requesting switching. FIG. 6 shows the contents of an entry in signal data structure 26 and FIG. 7 shows the contents of an entry in connection data structure 24.

FIG. 5 illustrates steps in the operation of controller 22 in the implementation of FIG. 3. Controller 22 could be implemented in a variety of ways consistent with these steps. For example, as discussed below, controller 22 may be implemented on a network of distributed workstations and servers, with its operations being performed on a number of processors including the processor in a workstation at each station (60, 62, 64 and so forth) of the communication system. It could also be centralized in a single server or host processor, or could be implemented with a combination of distributed processing and centralization. In any case, its operations can be performed with any appropriate combination of hardware and software components.

In FIG. 5, controller 22 idles by repeatedly testing in box 110 whether a user input signal from one of the user interfaces is waiting for a response. Controller 22 may include a queue of user input signals stored in the order received, in which case this test determines whether any user input signals are in the queue. If so, controller 22 takes the next waiting user input signal in box 112. If not, controller 22 continues to idle, and could, while idling, periodically broadcast update data to each user interface so that each representation of connections is kept current. Optionally, controller 22 could instead be driven by events generated at the user interfaces.

In handling a user input signal, controller 22 initially determines the appropriate response, in box 114. This can be done by any conventional technique for determining the type of a signal and generating an appropriate response based on that type. Controller 22 can access signal data structure 26, for example, to obtain a response, as can be understood from signal data structure entry 150 in FIG. 6. Entry 150, which is one of a number of entries in signal data structure 26, includes recognizer 152, branch type 154 and response generator 156. Controller 22 accesses entry 150 and uses recognizer 152 to determine if the input signal corresponds to the entry. If so, controller 22 uses the data from branch type 154 and response generator 156 for subsequent action. Recognizer 152 could be a list of the user input signals with which controller 22 can compare an input signal or it could be a function which controller 22 can execute to determine whether a user input signal corresponds to entry 150. Controller 22 can thus go through the entries in signal data structure 26 until it finds the entry corresponding to the user input signal being handled. Then, controller 22 can access branch type 154 and response generator 156 in providing the appropriate response.

Controller 22 can use branch type 154 of the corresponding entry to determine whether a user input signal requests a switching operation or another operation in which switch control signals are sent, as shown in box 116. To send switch control signals, controller 22 obtains a sequence of switch control signals from response generator 156. These signals may be stored verbatim in response generator 156 or may be generated based on data in the user input signal requesting the switching operation. In general, because the semantics of the switch control signals differs from that of the user input signals, a sequence of user input signals corresponds to another sequence of switch control signals, with one switch control signal corresponding to a sequence of several user input signals, one user input signal corresponding to a sequence of several switch control signals, or several corresponding to several. Signal data structure 26 defines, for each user input signal, identified by recognizer 152, an equivalent sequence of one or more switch control signals, in response generator field 156. The switch control sequence normally contains signals that change connections of the switch, but can also contain signals that request the current status of switch connections or other server or switch status, as discussed below in relation to FIG. 8.

In any case, controller 22 begins in box 118 to send the switch control signals in sequence. The entire sequence is handled as a transaction, and beginning the sequence includes whatever steps are necessary for controller 22 alone to have control of switching server 32. The test in box 120 determines whether signals remain to be sent. If so, the next switch control signal is sent to switching means 30 in box 122, and controller 22 then waits until it receives an acknowledge signal in box 124. If no acknowledge signal is received, or if the steps shown result in another type of failure, standard techniques of transaction processing can be used to recover and continue operations.

When all the switch control signals have been sent, controller 22, in box 126, provides data so that connection data structure 24 is updated to reflect the switching operations that have just been performed. Controller 22 can also relinquish control of switching server 32 at this point. With the switch signal sequence completed and the connection data structure up-to-date, the users are notified of the changes. As noted above, controller 22 can update the representations while idling and performing the test of box 110, by periodically broadcasting update data to the user interfaces.

The response to a user input signal which does not request a switching operation could take several forms. FIG. 5 illustrates two examples, each identified by controller 22 based on the data in branch type 154.

The user input signal may be a modify request, requesting a change in the contents of signal data structure 26. In response to this type, controller 22 accesses signal data structure 26 and makes the requested modification, in box 132. An additional type of user input signal could request display of one or more entries from signal data structure 26, so that the modify request could permit interactive editing of each displayed entry. The user could change the recognizer of an entry to change the set of user input signals of that entry's type, or the user could change the response generator of an entry to change the manner in which controller 22 responds to that entry's type. If the response generator is changed by changing the switch control signals it provides, user input signals of that type will produce a different effect on the connections. For example, a user might change the generator in the entry for a user input signal requesting a connection between stations A and B so that, rather than connecting audio and video pick up devices at A to rendering devices at B, the switch control signals cause a two-way connection of pick up devices at each station to rendering devices at the other.

The user input signal may be a status request, requesting that the status of connections as stored in connection data structure 24 be provided. In response to this type, controller 22 accesses connection data structure 24 and provides the requested data, in box 134.

FIG. 7 shows an exemplary connection data structure entry 160, illustrating the data that could be provided from such an entry. Entry 160 represents a one-way connection from a source device, such as a pick up device, to an input channel of the switch and through the switch to an output channel and thence to a destination device, such as a rendering device. An entry includes source device identifier 162 and destination device identifier 164, each of which is a device at one of the stations. Audio/video field 166 indicates whether the source and destination devices are audio only, video only or both, depending on the manner in which switching is controlled. In addition, entry 160 includes access control field 168, whose data controller 22 uses to determine which stations are authorized to access the entry, to read it or to change the connection it represents.

During operation of controller 22, connection data structure 24 normally contains a number of entries like entry 160, one entry for each existing connection of a source to a destination. In one-to-many switching, in which each destination is connected to a source at all times, while some sources are connected to more than one destination and others are not connected at times, connection data structure 24 can include exactly one entry for each destination and at least one entry for each source, including dummy entries for unconnected sources. Controller 22 operates to maintain these characteristics by ensuring that the state of the switch is mapped onto connection data structure 24. Controller 22 could do so by any of a number of conventional techniques for maintaining a set or data structure with such properties. Separate entries can be used to handle audio and video connections, making use of data in audio/video field 166. The dummy entries for unconnected sources can have a code as the destination device identifier 164, indicating that the destination is undefined.

Operation of controller 22 includes updating connection data structure 24 to reflect switching operations, in box 126. Controller 22 makes these updates by changing appropriate data in the fields of each data structure entry affected by the changes.

As noted above, control means 20 functions as an intermediary between the user and switching means 30. As a result, some of its operations depend on the operations of switching means 30, to which we now turn.

C. Switching Means

Figure 8:
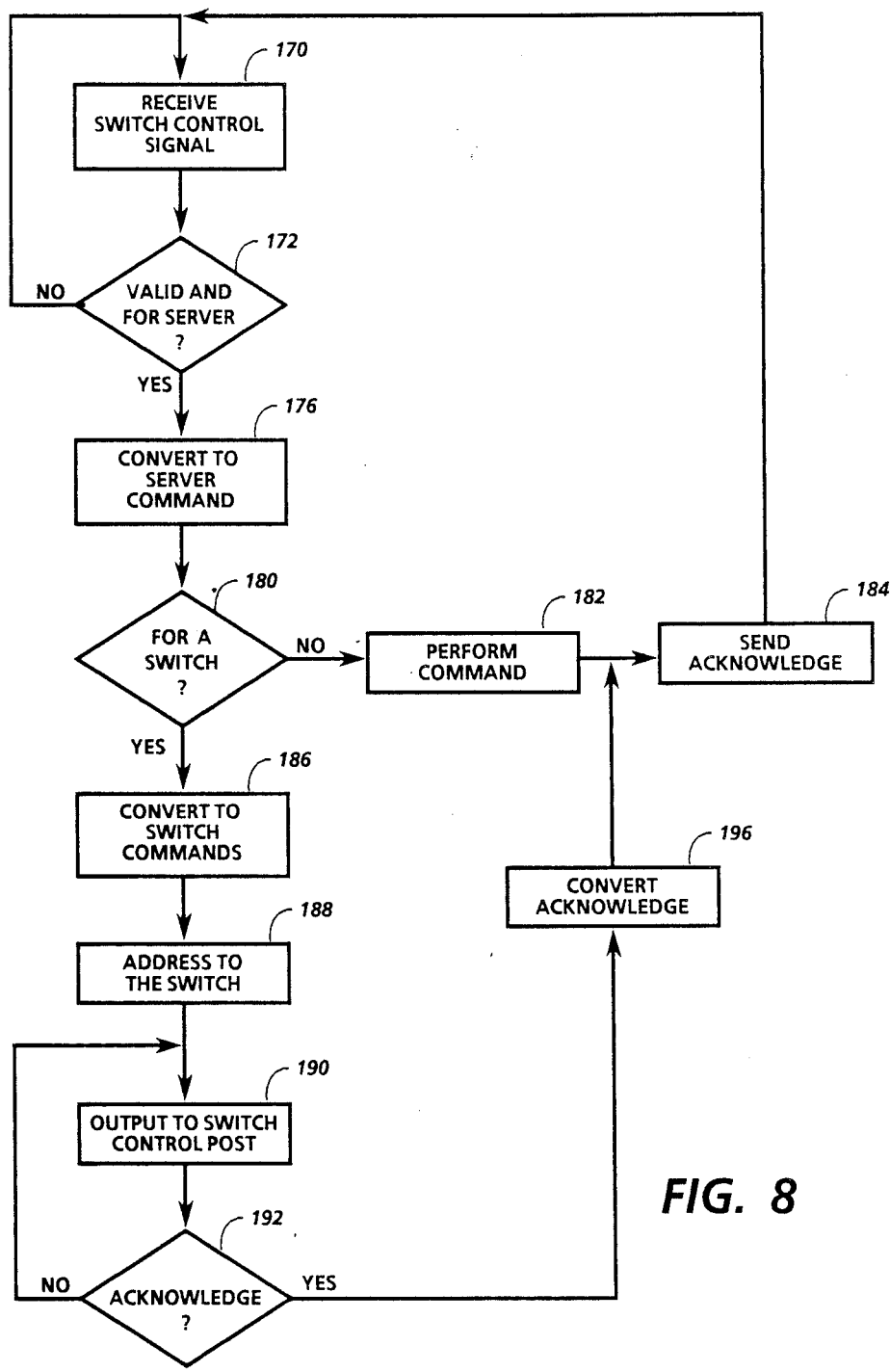
FIG. 8 is a flow chart showing operations of the switching server of FIG. 3.

As described above in relation to FIG. 3, switching means 30 can be implemented with switching server 32 and switch 34. The invention could also be implemented without a switching server, in which case controller 22 would provide its signals directly to switch 34. FIG. 8 illustrates operations performed by switching server 32.

In FIG. 3, switching server 32 provides an interface between control means 20 and switch 34. If appropriately implemented, one switching server could handle more than one switch. Also, one controller could handle more than one switching server, the controller handling user input signals; serializing them; converting them to sequences of switch control signals; and sending the switch control signals to the appropriate switching server, as described above in relation to FIG. 5.

Controller 22 communicates with switching server 32 by sending switch control signals over a signal path between them, as in box 122 in FIG. 5. Therefore, switching server 32 begins a responsive operation upon receiving a switch control signal, in box 170 in FIG. 8. The test in box 172 determines whether the signal received is a valid signal intended for this server. If not, the server returns to receive another switch control signal in box 170.

When a valid switch control signal for this server is received, switching server 32 converts it to a server command, in box 176. The server commands form an internal command language for the server that is independent of the control means to which it is connected and the switch it is controlling. Each server operation requested by one of the users is invoked by an appropriate sequence of server commands. Many server commands, however, require the server to convey a command to switch 34, such as commands to change switching connections or to provide hardware status signals. On the other hand, some commands can be handled within switching server 32, such as commands relating to the server's readiness or other status. Therefore, the test in box 180 determines whether a command should be conveyed to switch 34.

If performance of the server command does not require commands to switch 34, switching server 32 performs the server command in box 182, then sends an acknowledge signal to control means 20, in box 184, before returning to receive another switch control signal in box 170. This acknowledge signal indicates to the sender of the switch control signal that its signal has been received and the requested operation has been performed. The acknowledge signal may include or be preceded by the return of data; this would be appropriate, for example, if the switch control signal was a status command requesting data about the status of switching server 32. In that case, performance of the command in box 182 would include computation or retrieval of the necessary status data by switching server 32.

If performance of the server command requires commands to switch 34, switching server 32 converts the server command into a command sequence appropriate for switch 34, in box 186. In other words, the resulting switch commands are in the command language of switch 34. The step in box 188 then adds a header or other appropriate data indicating the destination of the switch commands and enabling them to be transmitted through an RS-232 port or other port to switch 34. In particular, if switching server 32 is controlling more than one switch, the step in box 188 provides an address that selects the appropriate switch and the port to which it is attached. The switch commands are then provided as output to this switch control port in box 190. If switch 34 receives the commands, it will send an acknowledge signal back. The test in box 192 determines whether the acknowledge signal has been received. If not, the switch command is resent in box 190.

The acknowledge signal from switch 34 can include data. For example, if a switching operation was commanded, data in the acknowledge signal can confirm that the operation has been performed; if hardware status was requested, data in the acknowledge signal can indicate the state of connection between two of the switch's ports. Upon receiving the acknowledgement signal, switching server 32 converts any data in the acknowledge signal into an appropriate form in box 196 before sending it back to control means 30 as part of its own acknowledge signal in box 184.

The ordinary operation of making or breaking connection between a pick up device and a rendering device can be requested by a switch control signal that includes an operation code and two arguments or operands. The operation code indicates whether the requested operation is connecting or disconnecting, while the arguments indicate the devices to be connected or disconnected. Switching server 32 converts the switch control signal into a server command by converting the operation code into the appropriate server operation code and the operands into server operands. These are converted into a sequence of switch commands based on the manner in which the devices are connected to switch 34. For example, switch 34 may require two switch commands to complete a connection between a pick up device and a rendering device, the first specifying the switch port to which the pick up device is connected and the second the port to which the rendering device is connected. If each port connects to a single device, there will be a one-to-one relation between the operands and the ports. Multiple ports could be achieved with various forms of multiplexing.

Switching means 30 receives switch control signals from control means 20, but control means 20 also exchanges signals with the user. We turn now to consider briefly the role of the user interfaces in system 10.

D. User Interface

A rich variety of user interface techniques could be used with the invention, and the invention facilitates further development of user interface techniques for communication system control.

In general, user interface 40 in FIG. 3 includes a body of software that exchanges data with display 42, keyboard 44 and mouse 46 and also with control means 20. This software serves a dual function: It converts signals from keyboard 44 and mouse 46 into a series of user input signals for control means 20; and it receives data from control means 20 with which it updates the representation of connections presented on display 42. When user interface 40 provides a user input signal requesting a switching operation, control means 20 sends appropriate switch control signals to switching means 30, as in the implementation of FIG. 3.

The representation of FIG. 4B provides a useful illustration of the relation between keyboard/mouse events and the resulting user input signals sent from user interface 40 to control means 20. Suppose that the user clicks the mouse on the display objects corresponding to a pair of stations before or after depressing a key on the keyboard indicating that the devices at one of those stations should be connected to the devices at the other. Software in user interface 40 responds to each mouse click by locating the cursor with respect to the display object representing the selected station and, based on this location, obtains an identifier of the station. Similarly, the software converts the key depression or other user input events into identifiers of switching functions and arguments to those functions. The software can then use these identifiers to generate one or more user input signals for control means 20 that request the corresponding switching operations.

In some cases, a relatively complex sequence of user input signals or other operations is necessary in response to a simple set of user input events. For example, the software could interpret selection of the display object of a station as a request to create a two-way video connection between the selected station and the requesting station, in which case a sequence of user input signals may be necessary to request all the connections between specific devices. Or if it is necessary to break a connection before making a new connection, the software could cause an indication on display 42 requesting additional user input events to identify which connections to break. Then, after determining which connections to break, the software can send an appropriate sequence of user input signals to control means 20. Or control means 20 may require access data in order to perform a requested operation, in which case the software could obtain the access data interactively from the user or from a data structure.

Additional software in user interface 40 receives data from control means 20 defining the current state of connections among communication devices. Control means 20 may send these data after a switch operation, during updating in box 126 in FIG. 5, or after a status request, as in box 142 in FIG. 5. The software converts these data into the representation presented by display 42. This function can include providing data for display that includes the visual cues that identify the stations within the representation. In FIG. 4B, the visual cues are user profiles which identify stations, but could optionally be alphanumeric or text identifiers. Or data could be displayed that provides a visual cue for a station based on data sampled from one of the pick up devices such as a camera at that station. This software can also provide other data for display to the user, such as an error message based on an error signal.

If the user interface functions described above are provided by software on each workstation, the software on each workstation can be different from that of the other workstations. The manner in which connections are represented on the display of each workstation can be different from the others, and the manner in which user input signals are generated can similarly be different. The independence of the workstations thus assists in the development of user interface features.

Having described major functional components of a system according to the invention and their operations, we now examine a particularly useful implementation.

E. An Illustrative Implementation

Figure 9:
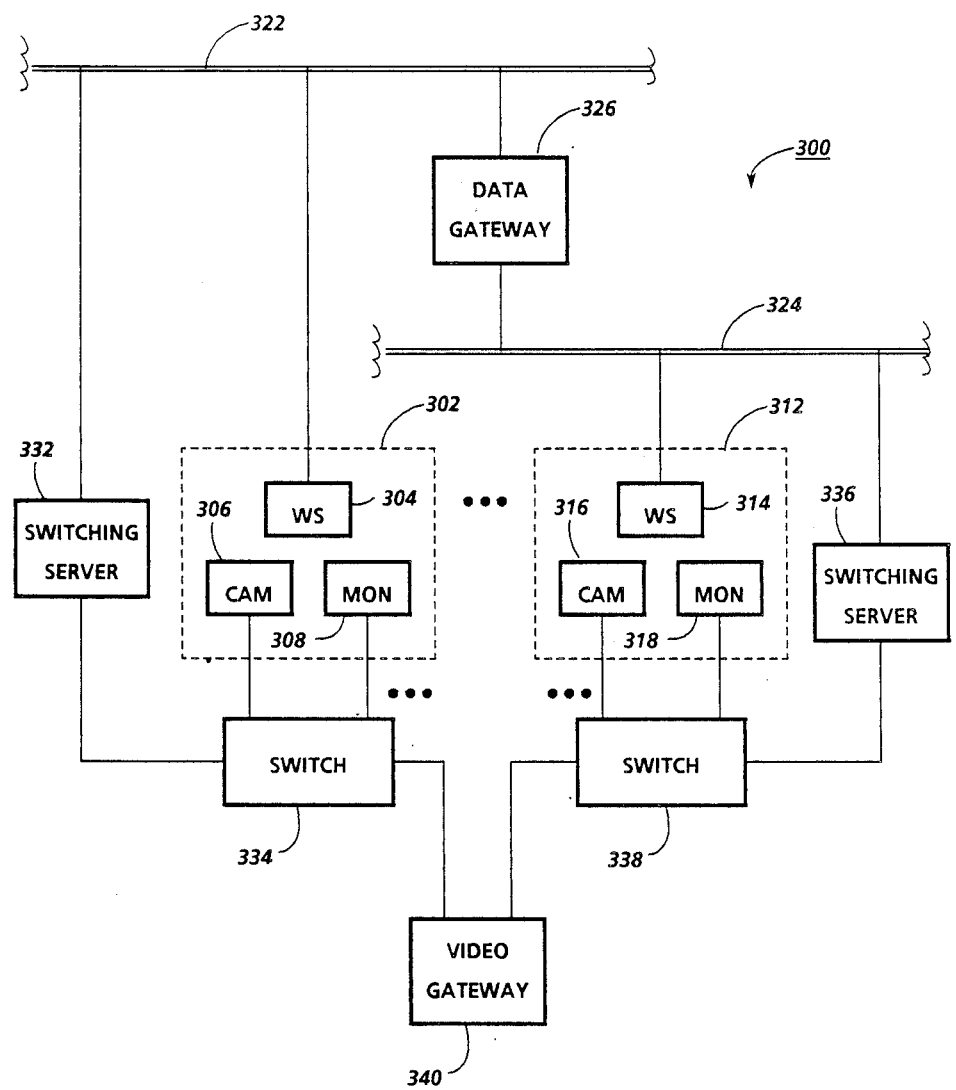
FIG. 9 is a schematic block diagram of a multi-switch, multi-site communication system according to the invention.
Figure 10:
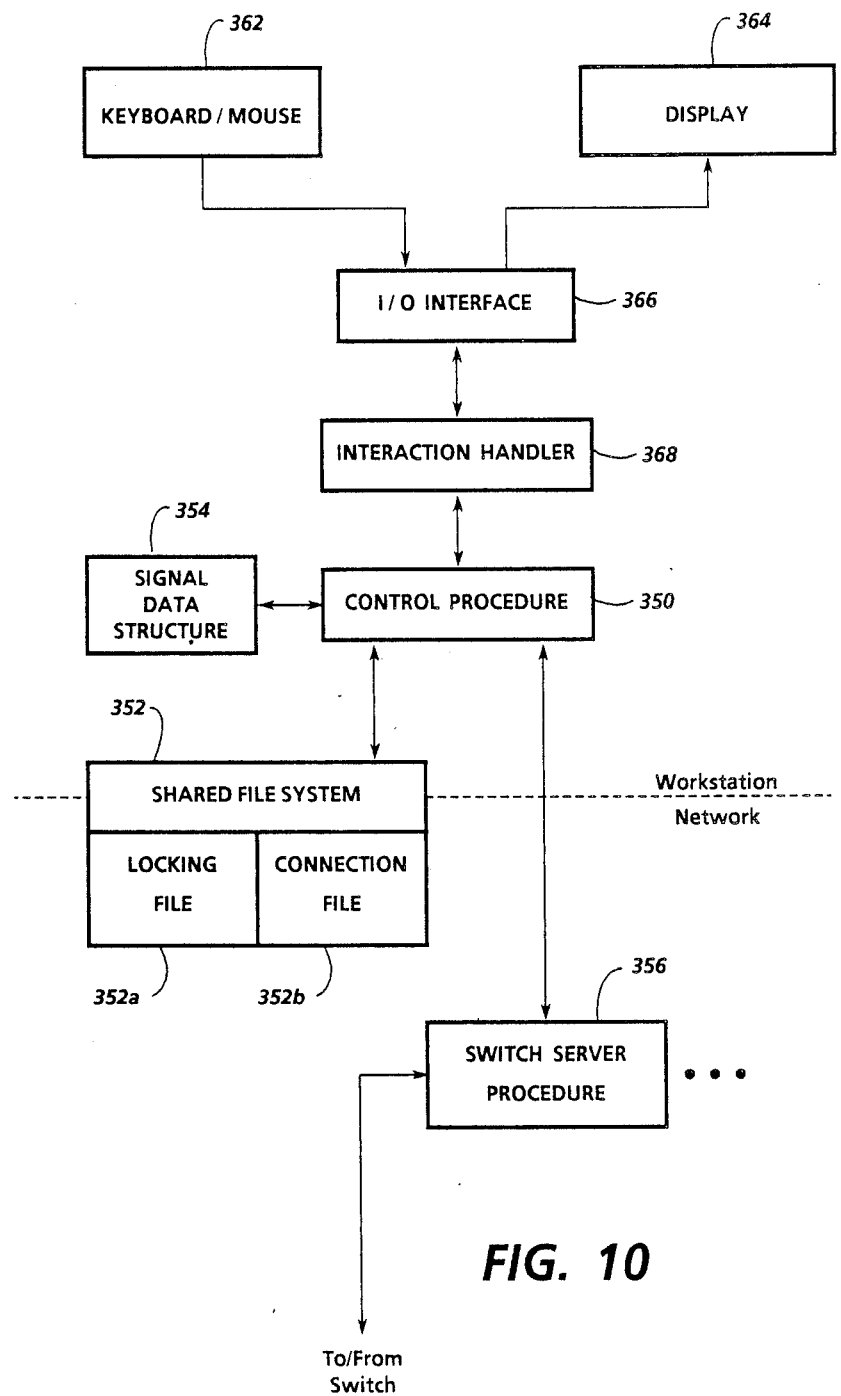
FIG. 10 is a schematic block diagram illustrating components of the control means, switching means and user interface in the system of FIG. 9.

FIGS. 9 and 10 illustrate an implementation of the invention including multiple switches, multiple physical sites and a distributed control means. FIG. 9 shows the overall circuitry of system 300, and FIG. 10 is a detail showing components of the user interface, control means and switching means.

Multi-switch, multi-site system 300 includes components corresponding to the broad components of system 10 in FIG. 3. Stations 302 and 312 correspond to two of the stations, such as stations 60 and 62. The user interfaces of workstations 304 and 314 correspond to user interface 40, while cameras 306 and 316 and monitors 308 and 318 correspond to communication devices 50. Control procedures executed by workstations 304 and 314, described in relation to FIG. 10 below, and data networks 322 and 324 connected by data gateway 326 correspond to control means 20. Switching servers 332 and 336, switches 334 and 338, and video gateway 340 correspond to switching means 30.

As shown in FIG. 9, workstation 302 has a data link to data network 322, while workstation 312 has a data link to data network 324. Data networks 322 and 324 are each a conventional digital electronic communication network, including communication protocols, such as an Ethernet. Data network 322 and the linked workstations, including workstation 302, may be in a physical site remote from that of data network 324 and its linked workstations, including workstation 312. Therefore, data networks 322 and 324 are connected through a conventional data gateway 326. Gateway 326 communicates according to the same network communication protocols as networks 322 and 324 and permits data communication among all workstations on both networks, including workstations 304 and 314, according to standard practice. Additionally, gateway 326 may function to transmit data signals between the physical sites of networks 322 and 324, according to standard practice.

Switching server 322 has a link to network 322, and is connected to switch 334 by a communications connection, such as an RS-232 interface. Similarly, switching server 336 is linked to network 324 and connected by a communication connection to switch 338. Like data networks 322 and 324, switches 334 and 338 also each serve a single physical site and are connected by a gateway, in this case video gateway 340. Switch 334 has an input port connected to camera 306, an output port to monitor 308, as well as other ports connected to the other communication devices at the stations at its site. Similarly, switch 338 has ports connected to camera 316 and monitor 318 and to other devices at its site. In addition, at least one input and one output port of each switch may be connected to video gateway 340, making it possible to provide connections between communication devices of stations located at different sites. Like data gateway 326, video gateway 340 may provide encoding, compression and transmission of signals between remote sites, according to standard practice. For that purpose, video gateway 340 may be a Widcom Codec transmitting over 56 KBit service.

Switches 334 and 338 provide for matrix switching between NTSC input ports and output ports, and each is controlled digitally by commands received over a digital communications interface. For example, each may be a Utah Scientific Re-programmable Panel Router System Model No. PL-160, with an RS-232 control interface and an AVS-1B Routing System for the communication devices. Switching servers 332 and 336 may each be a Sun Microsystems workstation, Model No. 2/50, connected to the RS-232 control interface of the respective switch and linked to the respective networks as a workstation would be. The communication devices may be implemented with conventional cameras, microphones, monitors and the like.

A sequence of switch control signals requesting a connection between camera 306 and monitor 318, for example, involves both switching servers 332 and 336. Switches 334 and 338 can make this connection through their ports which connect to video gateway 340. The user may, however, be unaware that this connection is any different than a connection that does not require video gateway 340, because this connection may appear in the representation on the user's display the same as any other connection. In FIG. 4A, for example, stations A and B could be connected through a single switch, while stations B and C could be connected through a video gateway. Similarly, the user input signals may be such that a single user input signal can request this connection, even though both switching servers 332 and 336 must respond to that signal. In this case, the control means could be implemented in a distributed manner, as discussed below, and would handle the user input signal, convert it to appropriate switch control signals for each switching server involved, and send the switch control signals to those servers.

Each level of system 300 may have its own semantics of connection. The user input signals from the user interfaces may have a semantics that permits the user to request a change in the connections. The switch control signals on the network may have another semantics consistent with the network protocols and that also permits transfer of information with the switching servers. Since this may require distinguishing between switching servers, between stations and between devices at a station, the switch control signal semantics is likely to differ from the user input signal semantics. The server command semantics of each switching server and the switch command semantics of each switch may, in turn, differ from each other and from the switch control signal semantics. System 300 allows for this diversity of semantics, resulting in much greater flexibility in implementation.

In the implementation shown in FIG. 9, the control means is distributed among the workstations of the system, as can be understood more fully from FIG. 10. FIG. 10 shows parts of the control means, the switching means and the user interface of system 300 of FIG. 9.

Control procedure 350 is part of the control means, performing the functions described above in relation to control means 20 in FIG. 3, but only for one of the workstations in system 300. During its operations, it accesses shared file system 352, a file system that also provides part of the control means and is available to all the workstations as discussed in more detail below. Control procedure 350 also exchanges signals with at least one switch server procedure 356, a procedure executing on one of the switching servers in system 300.

Control procedure 350 serves as a distributed part of the control means. Similarly, shared file system 352 may be distributed among the workstations in a system. For example, each of the workstations could run a system such as Sun OS 3.2, which includes a shared distributed file system. Such a file system could respond to requests from control procedure 350 in one of the workstations without the necessity for that workstation to identify the device on which the relevant data is stored.

In the illustrated implementation, shared file system 352 includes locking file 352a. The control procedures of the workstations in system 300 serialize user input signals using locking file 352a. Because the control means is distributed as illustrated in FIG. 10, the user input signals that originate at the user interfaces of the work stations must be serialized, so that a signal or signal sequence originating from one work station can be carried out completely without interference from a signal or signal sequence originating from another work station. Locking file 352a prevents interference by means of a lock that can only be held by one workstation at a time. User input signals from other workstations are ignored until the lock is released upon completion of the operation requested by the workstation holding the lock. As a result, signals from the users are handled serially, in the sequence in which the lock is held.

In addition to its role in serializing user input signals, shared file system 352 can also provide shared data in a consistent manner to all the workstations. For that purpose, it also includes connection file 352b, containing the connection data structure. Optionally, connection file 352b could have a lock of the type described above, so that it would also serve as the serializing means.

FIG. 10 shows signal data structure 354 distributed to each workstation rather than in shared file system 352. The signal data structure of each workstation can thus be independent of those of the other workstations, which may be advantageous in developing diverse user interface techniques, since it would permit the signal data structure of each workstation to be very different from the others. Alternatively, the work stations could share a single signal data structure and maintain it consistently.

If a shared file system like system 352 is used, control procedure 350 can generally follow the steps in FIG. 5, but with a number of significant changes. To obtain the appropriate response to a user input signal, in box 114, control procedure 350 must access its signal data structure 354. Having done so, it must, in box 118, request the lock from locking file 352a in shared file system 352. It may be necessary to request the lock several times before obtaining it, so that control procedure 350 must operate accordingly. Once the lock is obtained, control procedure 350 may proceed to send switch control signals, in boxes 120–124. Similarly, in box 126, control procedure 350 can write to connection file 352b so that it can update the connection data structure. Upon completion of write update in box 126, control procedure 350 releases the lock. And in box 134, control procedure 350 can obtain the lock to read the connection data structure with assurance that no switch operations are in progress. These access procedures thus ensure that switching operations are performed without interfering with each other. In general, the control procedure obtains the lock in order to initiate its operations, carries out the necessary steps, updates the connections data structure, and finally releases the lock. Thus each user input signal relating to shared data is handled to completion before the next can be begun.

Shared file system 352 may also be used in other ways in FIG. 5. For example, the step of providing update data to the user interfaces, part of box 126, could be initiated by a procedure which, through the shared file system, notifies each of the other workstations that an update is necessary. For this purpose, the shared file system can include a list of workstations that receive update data. The data necessary to perform the update could also be provided, or each workstation could retrieve it after notification.

The connection and signal data structures could be implemented in various other ways. For example, an additional server on the network could store the data structures and could broadcast changes in state of connection to all the workstations or the workstations could periodically poll the server to obtain changes.

FIG. 10 also illustrates in more detail the role of user interface software in relation to other components of a system according to the invention. Keyboard/mouse 362 corresponds to keyboard 44 and mouse 46 in FIG. 3, and display 364 corresponds to display 42. I/O interface 366 and interaction handler 368 are software components that also provide functions of user interface 40. Interaction handler 368 exchanges signals with the user through I/O interface 366, which provides signals to display 364 and receives user input signals from keyboard/mouse 362.

These user interface components can all be implemented on a conventional workstation. Keyboard/mouse 362 and display 364 are conventional components and may each include a respective processor for exchanging signals with I/O interface 366, as is conventional. I/O interface 366 and interaction handler 368 each include software data structures and processes that mediate between the control means and the user at keyboard/mouse 362 and display 364, according to conventional techniques for interactive computational interfaces. I/O interface 366 includes data and control structures appropriate for handling keyboard and mouse input, for controlling the display, and for handling user interactions. Interaction handler 368 has data and control structures appropriate for generating the user input signals for control procedure 350 and for receiving data from control procedure 350 that represents the state of connections. When a user takes actions using keyboard/mouse 362 with respect to display 364, I/O interface 366 converts the actions into signals for interaction handler 368. Interaction handler 368 in turn provides to control procedure 350 a user input signal requesting a switching operation. Control procedure 350 then sends appropriate switch control signals to switch server procedure 356, as described above.

Each workstation in system 300 may be a conventional workstation such as a Sun Microsystems Model No. 3/160, running Sun OS 3.2 as its operating system. To provide user interface software, the operating system of each workstation may support a programming environment such as Smalltalk-80 (described in Goldberg, A., *Smalltalk-80—The Interactive Programming Environment*, Addison-Wesley, Reading, Mass., 1984) or Sun tools in combination with C language, available from Sun Microsystems.

F. Miscellaneous

Many other variations of the implementations described above are within the scope of the invention. In implementing the control means, for example, a single main computer could be provided, with a number of video based terminals. Similarly, the connection data structure could be stored and managed in a variety of ways. And the switch could be distributed, with broadband connection among the communication devices, and specific connections established through assignment of channels to pick up and rendering devices.

The displays described above could be CRTs, as is currently conventional for a workstation, or could be any other type of display capable of providing information about connections. Each display could be another type of screen display, such as a liquid crystal display (LCD), or, for a relatively unchanging system, could be a background matrix or template with light emitting diodes (LEDs) or other light indicators to show connection between devices shown in the matrix or template.

Similarly, the user input device could be any appropriate device for user input, including any type of keyboard, with or without a pointing device such as a mouse, joystick or the like. The user input device could alternatively be a reader for reading printed characters or signals, a speech recognition device for speaking input, or a location sensing device for gestural input.

The communication devices used with the invention are not limited to microphones, cameras, speakers and displays, but could include other types of devices for picking up signals and rendering them into perceptible form. In addition, the communication devices could include devices that convert or modify a signal, that combine signals, that record and playback a signal or that otherwise process signals.

Connections between communication devices can be made by electrical coupling or by any other suitable technique, including optical or other electromagnetic techniques. In general, for purposes of the invention, a connection is any complete signal path from a source to a destination, and a switch is any device capable of selectively providing connections by making and breaking them.

Because a connection is a signal path from a source to a destination, a representation of a connection similarly includes information about whether a given signal source and signal destination are connected. A representation that does not indicate which source is connected to which destination is not a representation of a connection, even though it may indicate that a given source or destination is connected to something. For example, an indicator that a given source is connected, by itself, does not represent the connection because the user cannot identify from it the destination to which that source is connected.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A system comprising:
   first and second stations at respective first and second locations, the first station comprising a first display and a first user input device, the second station comprising a second display and a second user input device;
   first and second communication devices, the first communication device being at the first location with the first station and the second communication device being at the second location with the second station;
   switching means for performing a switching operation in response to a switch control signal; the switching operation affecting a connection between the first and second communication devices; and
   control means connected for receiving signals from the first and second user input devices requesting switches in the connection; the control means further being connected for providing the switch control signal to the switching means in response to a respective one of the signals from the first and second user input devices; the control means comprising a connection data structure containing connection data indicating the connection; the control means updating the connection data structure after providing the switch control signal; the control means further being connected for providing update data so that the first and second displays each present a respective representation of the connection between the first and second communication devices that is consistent with the updated connection data structure.

2. The system of claim 1 in which the control means comprises a data network for providing the switch control signal to the switching means, the switching means comprising:
   a switch for making and breaking a set of connections including the connection between the first and second communication devices; and
   a switching server for receiving the switch control signal from the data network and for providing commands to the switch based on the switch control signal.

3. The system of claim 1 in which the first and second communication devices are positioned in first and second groups, respectively; the first station including the first group and the second station including the second group.

4. The system of claim 3 in which the first communication device comprises a camera and the second communication device comprises a monitor, the switching means comprising a video switch for switching the connection between the first and second communication devices so that the monitor displays an image which is based on a video signal from the camera.

5. The system of claim 1 in which the control means provides the up date data after the switching means switches the connection so that the respective representations presented by the first and second displays each represent the switched connection.

6. The system of claim 1 in which the control means is further for modifying the switch control signal that is provided based on the respective one of the signals from the first and second user input devices, the control means modifying the switch control signal in response to a modification request signal from the first user input device requesting a modification.

7. The system of claim 6 in which the control means further comprises a signal data structure containing data for generating the switch control signal based on the respective one of the signals from the first and second user input devices, the signal data structure being accessed in response to the modification request signal.

8. The system of claim 1 in which the control means further operates, upon receiving a respective one of said switch request signals from each of the first and second user input devices, to provide a corresponding switch control signal based on the respective switch request signal from the first user input device before providing a corresponding switch control signal based on the respective switch request signals from the second user input device.

9. The system of claim 1, further comprising a third station, the third station comprising a third display; the control means further being connected for providing the update data so that the third display presents a representation of the connection that is consistent with the updated connection data structure.

10. A system comprising:
first and second communication devices;
switching means connected for performing a respective switching operation in response to a switch control signal; the respective switching operation switching a connection between the first and second communication devices;
a user interface that includes a first display and a first user input device; and
control means connected for receiving a signal from the first user input device requesting a switch in the connection; the control means further being connected for providing the switch control signal to the switching means in response to the signal from the first user input device; the control means further being connected for providing update data to the user interface after providing the switch control signal, the update data indicating the connection after the respective switching operation;
the user interface, in response to the update data, providing a representation of the connection indicated by the update data on the first display, the user interface providing the representation by providing first and second device display features and a connection display feature on the first display, the first and second device display features representing respectively the first and second communication devices, each of the first and second device display features having a respective display location, the respective display location of each of the first and second device display features being different from the respective display location of the other, the connection display feature representing the connection between the first and second communication devices, the connection display feature extending between the respective display locations of the first and second device display features.

11. The system of claim 10 in which each of said first and second device display features is a display object, said connection display feature being a link between display objects.

12. The system of claim 10 in which the signal from the first user input device requesting a switch is a sequence of switch request signals, the switch control signal being one of a plurality of switch control signals provided in response to the signal from the first user input device, the switch control signals and the switch request signals each having a respective semantics, the respective semantics of the switch request signals being different than the respective semantics of the switch control signals, the control means operating to generate the switch control signals equivalent to the switch request signals.

13. The system of claim 10 in which the control means comprises a data network for providing the switch control signal to the switching means, the switching means comprising:
a switch for making and breaking a set of connections including the connection between the first and second communication devices; and
a switching server for receiving the switch control signal from the data network and for providing commands to the switch based on the switch control signal.

14. The system of claim 10 in which the first and second communication devices are positioned in first and second groups, respectively; the first and second groups being apart from each other; the user interface being positioned with the first group.

15. The system of claim 14 in which the first communication device comprises a camera and the second communication device comprises a monitor, the switching means comprising a video switch for switching the connection between the first and second communication devices so that the monitor displays an image that is based on a video signal from the camera.

16. A system comprising:
a plurality of stations, each station comprising a respective display, a respective user input device, and a respective communication device; each station being at a respective location;
switching means for performing a switching operation in response to a switch control signal; the switching operation affecting a connection between first and second ones of the respective communication devices; and
control means connected for receiving signals from the respective user input devices requesting switches in the connection; the control means further being connected for providing the switch control signal to the switching means in response to one of the signals from the respective user input devices; the control means comprising a connection data structure containing connection data indicating the connection between the first and second respective communication devices; the control means updating the connection data structure after providing the switch control signal; the control means further being connected for providing update data so that the respective displays each present a respective representation of the connection between the first and second respective communication devices that is consistent with the updated connection data structure.

17. A system comprising:

first and second stations, the first station comprising a user interface that includes a first display and a first user input device, the second station comprising a second display and a second user input device;

first and second communication devices; the first and second communication devices being positioned in first and second groups, respectively; the first station including the first group and the second station including the second group;

switching means for performing a switching operation in response to a switch control signal; the switching operation affecting a connection between the first and second communication devices; and control means connected for receiving signals from the first and second user input devices requesting switches in the connection; the control means further being connected for providing the switch control signal to the switching means in response to a respective one of the signals from the first and second user input devices; the control means comprising a connection data structure containing connection data indicating the connection; the control means updating the connection data structure after providing the switch control signal; the control means further being connected for providing update data so that the first and second displays each present a respective representation of the connection that is consistent with the updated connection data structure;

the user interface being responsive to the update data provided by the control means for providing a respective representation of each of said first and second groups on the first display and for providing a representation of the connection between the first and second communication devices on the first display as a connection between the respective representations of the first and second groups.

18. The system of claim 17 in which the user interface is further for including in said respective representation of the first group a respective visual cue identifying said first group.

* * * * *